Dec. 8, 1931.  H. H. FLIEGEL  1,835,855
HATCH CONSTRUCTION FOR LOWER DECKS
Filed May 2, 1931  2 Sheets-Sheet 2
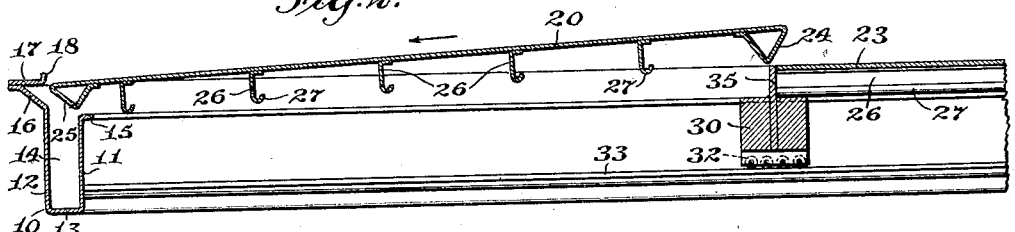
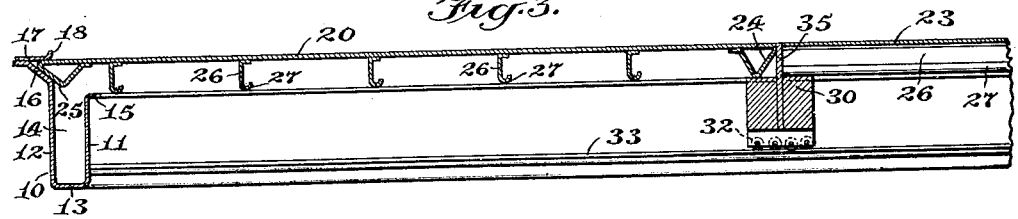
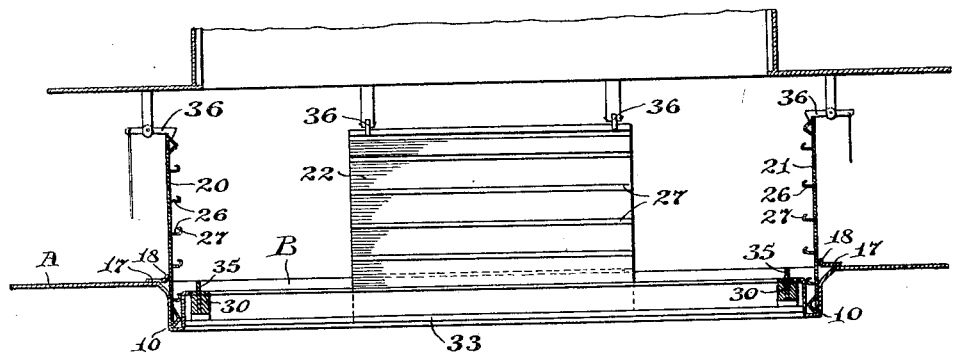
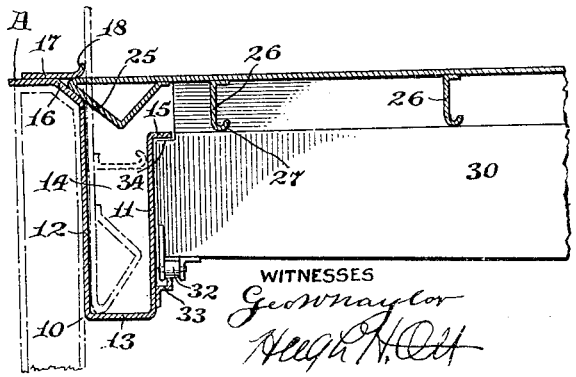
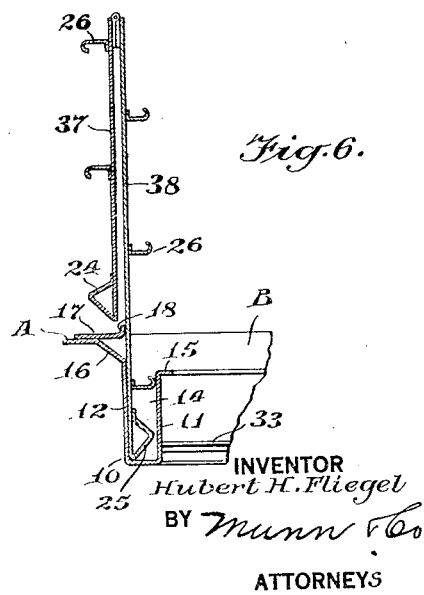
INVENTOR
Hubert H. Fliegel
BY Munn & Co
ATTORNEYS Patented Dec. 8, 1931

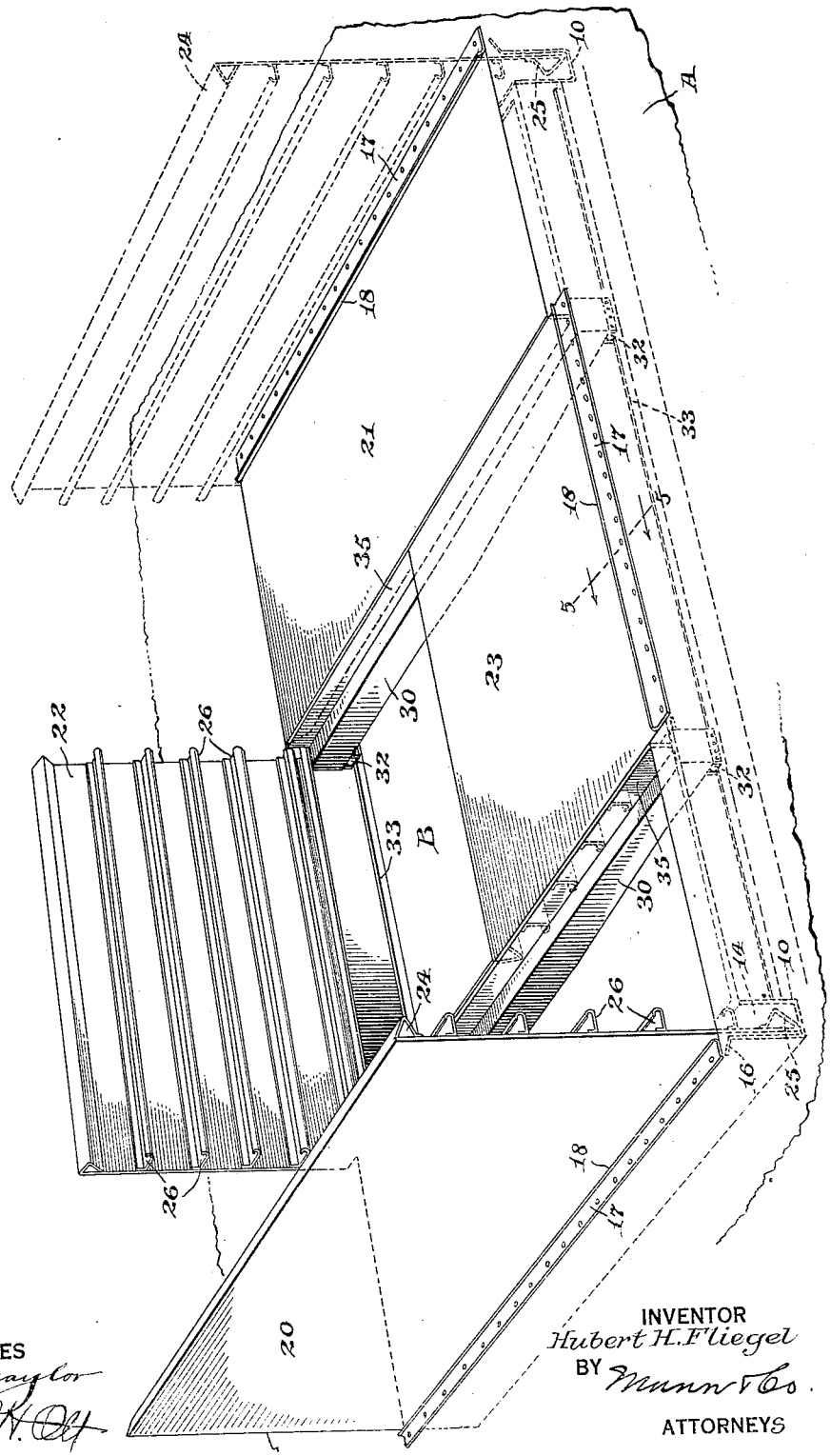

1,835,855

UNITED STATES PATENT OFFICE

HUBERT H. FLIEGEL, OF MERRICK, NEW YORK

HATCH CONSTRUCTION FOR LOWER DECKS

Application filed May 2, 1931. Serial No. 534,672.

This invention relates to a hatch construction, and has particular reference to an improvement in hatches which are especially designed for the lower decks of marine vessels.

The present invention aims to provide an improved metal hatch construction to take the place of the common hatches which embody wooden hatch covers and supporting means, whereby to eliminate the many attendant disadvantages, notably, the ever present danger of injury to the crew and damage to the vessel in the handling of the covers and beams; to effect a saving in the time and number of men required for the emplacement and removal of the hatch covers; to avoid the expense of periodic replacement of the cover sections and beams, and to avoid the enormous deck space required for the accommodation of said covers and beams when the holds are open.

The present invention resides in an improved hatch construction for lower decks, by virtue of which the danger of injury to the crew or damage to the vessel by falling hatch covers or beams is practically eliminated; the number of hatch cover sections and beams and the amount of time and labor incident to the handling of the same is reduced to an absolute minimum; and the problem of storage of the covers and beams is admirably solved so as to cause little, if any, interference with the deck space.

More specifically, the invention comprehends a hatch cover construction, in which the hatchway frame or coaming constitutes a common means for the seating of the hatch cover sections, for carrying the cover section supporting beams and for holding the cover sections in their inactive open or stowed position.

Other objects of the invention reside in the comparative simplicity of construction and mode of operation of the hatch, the economy with which it may be produced and installed and the general efficiency derived therefrom.

With the above recited and other objects in view, reference is had to the following description and accompanying drawings, in which there are exhibited several examples or embodiments of the invention, while the claims define the actual scope of the same.

In the drawings:

Figure 1 is a perspective view of a hatch constructed in accordance with the invention, and illustrating the same in partially opened condition.

Figure 2 is a fragmentary longitudinal sectional view through the hatch showing the final movement of an end cover section to its closed position.

Figure 3 is a similar view showing the end cover section in its fully closed position.

Figure 4 is a reduced longitudinal sectional view through the hatch showing the cover sections in opened or stowed condition, with the supporting beams in their inactive out-of-the-way position.

Figure 5 is an enlarged transverse sectional view taken approximately on the line indicated at 5—5 in Figure 1.

Figure 6 is a view of a slightly modified form of the invention illustrating a hatch cover section having a hinged portion.

Referring to the drawings by characters of reference, A designates one of the lower decks of a vessel which is cut out to provide a hatchway B. The hatchway B is framed by a depending coaming 10 which is of channel shaped cross sectional configuration having inner and outer side walls 11 and 12 joined by a bottom wall 13 and defining an upwardly opening channel or well 14. The inner wall 11 terminates below the upper surface of the deck A and below the upper edge of the outer wall 12, and said inner wall is provided with an inwardly directed bead or arm 15. The outer wall 12 is formed at its upper end with an outwardly flared or inclined portion 16 which terminates flush with the deck A. A horizontal inwardly directed lip 17 extends from the portion 16 and has its free upwardly curved extremity 18 disposed substantially in alignment with the inner surface of the outer wall 12.

The hatch further includes a plurality of cover sections which in the present illustration consists of the fore and aft sections 20 and 21 which are designed to cover the entire width of each end of the hatchway and a pair of intermediate or central hatch sections 22 and 23, each of which covers a half of the width of the hatch area which is left uncovered by the end sections. The outer and inner edges of each section are provided with marginal substantially V-shaped depending ribs 24 and 25, and the outermost inclined surface of the latter ribs corresponds to the angularity of the portion 16 of the coaming, which portion acts as a seat therefor. The overhanging lip 17 functions with the portion 16 to produce in effect a recess for snugly receiving the outer edges of the hatch covers, as clearly illustrated in Figures 3 and 5. In practice, if desired, the V-shaped ribs 24 and 25 may be formed integral with the sheet metal from which the main area of the hatch covers is constructed.

In order to further brace and strengthen the hatch covers, the same are provided with angle strips 26 spaced from each other and paralleling the ribs 24 and 25. In order to avoid sharp corners, the free outer edges of the strips 26 are curved inwardly as at 27. The free edges of the strips 26 of the end sections 20 and 21 are designed to seat upon the bead or rim when said sections are in their closed condition, as clearly illustrated in Figure 3 of the drawings. In order to support the intermediate sections in their closed condition and to assist in supporting the end sections, a pair of beams 30 are employed, which are supported transversely in the hatchway for longitudinal shifting movement. The beams 30 are formed on their under sides adjacent their opposite ends with a plurality of journaled rollers 32 which rest upon tracks 33 formed on the opposite side walls 11 of the coaming. The upper opposite ends of the beams 30 are rabbeted as at 34 to fit under the bead or rim 15, whereby the beams are guided in their movement and prevented from being displaced upwardly by the hoisting apparatus or tackle handling the cargo. Each beam is provided with an upwardly projecting intermediate longitudinally extending division web 35 and when the beams are in their active position for supporting the cover sections, the opposite ends of the strips 26 located at the side of the central cover sections rest upon the upper surfaces of the beams, as clearly illustrated in Figures 1, 2, 3 and 5. The upper surfaces of the beams also afford a seat or rest for the V-shaped ribs 24 at the free inner edges of the end cover sections 20 and 21.

When the hatch is to be opened, the cover sections are swung upwardly and outwardly to a substantially vertical position and the lower ends are then sunk into the channel or well 14, as clearly disclosed in Figures 1, 4 and 5. In this position, the outer surfaces of the hatch covers are engaged by the curved extremities of the lips 17, and in order to insure against the possibility of accidental movement of the covers, latches 36 conveniently supported from the next adjacent upper deck or otherwise may be engaged with the upper edges of the covers, as illustrated in Figure 4 of the drawings.

From the foregoing, it is apparent that the number of men and the time required to open and close the hatches will be reduced to an absolute minimum, and it is possible that in some instances where it is not necessary to open the entire hatchway, one or more of the hatch covers only may be opened. It is also evident that when opened, the hatch covers do not seriously interfere with the deck space, and it is even possible with the covers in the opened position to load several of the holds simultaneously.

In some instances, where the headway between the decks is insufficient to accommodate the height of the hatch covers when disposed upright, the same may be provided with hinged portions 37, as clearly illustrated in Figure 6 of the drawings, which hinged portions are capable of being swung to parallel position to the main section 38 of the hatch cover when the covers are disposed in their open upright position.

While there have been illustrated and described several preferred embodiments of the invention, no limitation is necessarily intended to the precise structural details, as variations and modifications which properly fall within the scope of the appended claims may be resorted to when desired.

What is claimed is:

1. A hatch construction for lower decks including hatch cover sections, supporting beams for said sections and a hatchway frame fashioned to constitute a common means for seating the cover sections when closed, for carrying the beams for horizontal shifting movement respectively to active and inactive positions lying within the hatchway frame and for partially receiving therein and holding the cover sections in an inactive stowed position.

2. A hatch construction for lower decks including a sectional hatch cover, supporting beams for said cover sections and a hatchway frame fashioned to respectively form a way frame in which the beams are shiftable guideway from an active supporting position to an inactive out-of-the-way position, a seat for the outer edges of the cover sections when closed and a channel for holding the cover sections in an inactive opened position.

3. A lower deck hatch construction having the combination of a sectional hatch cover including mating sections, supporting beams for said cover sections and a hatchway frame fashioned to respectively provide a guideway for mounting the beams transversely of the hatchway for shifting movement longitudinally thereof, a recessed seat for the outer edges of the cover sections and a channel for the reception of the cover sections to hold them in an inactive opened position.

4. A lower deck hatch construction including a channeled frame opening upwardly and defining a well surrounding the hatch opening of the deck, and hatch cover sections respectively swingable to a vertical position and slidable downwardly to dispose their lower ends within the well.

5. A lower deck hatch construction including a channeled frame opening upwardly and defining a well surrounding the hatch opening of the deck and a hatch cover composed of central fore and aft sections, the former being swingable laterally and upward to a vertical position and slidable downwardly to dispose their lower ends within the well and the latter being swingable respectively forwardly and rearwardly and upward to a vertical position and slidable downwardly to dispose their lower ends within the well.

6. A lower deck hatch construction including a channeled frame opening upwardly and defining a well surrounding the hatch opening of the deck and a hatch cover composed of central fore and aft sections, the former being swingable laterally and upward to a vertical position and slidable downwardly to dispose their lower ends within the well and the latter being swingable respectively forwardly and rearwardly and upward to a vertical position and slidable downwardly to dispose their lower ends within the well and a pair of transverse supporting beams mounted at their opposite ends in the sides of the frame for sliding movement longitudinally thereof and adapted when in active position to support the side edges of the intermediate cover sections and the free ends of the fore and aft cover sections.

7. In a hatch construction for lower decks, a hatchway including a marginal depending upwardly opening channeled coaming, end hatch cover sections for covering the entire width of each end of the hatchway and a pair of central hatch cover sections combining to cover the remaining portion of the hatchway between the end cover sections, said sections adapted when in covering relation to seat at their outer edges upon the coaming and adapted to be swung upwardly and outwardly to an open position with the lower ends sunk into the coaming channel.

8. In a hatch construction for lower decks, a hatchway including a marginal depending upwardly opening channeled coaming, end hatch cover sections for covering the entire width of each end of the hatchway, a pair of central hatch cover sections combining to cover the remaining portion of the hatchway between the end cover sections and beams mounted transversely in the hatchway for longitudinal shifting from an inactive position at the ends of the hatchway to an active position intermediate the ends thereof.

9. In a hatch construction for lower decks, a hatchway formed in the deck, an upwardly opening channel shaped coaming framing the hatchway and depending therefrom, hatch cover supporting means mounted transversely within the hatchway coaming for guided longitudinal shifting movement from an active supporting position intermediate the ends of the hatchway to an inactive out-of-the-way position at the ends thereof, and hatch cover sections adapted when in covering relation to seat at the outer edges upon the coaming and to rest upon the beams and adapted to be swung upwardly and outwardly to an open vertical position with the lower ends sunk in the channel shaped coaming.

10. A lower deck hatch construction having the combination of a plurality of hatch cover sections and a substantially U-shaped coaming framing a hatchway in the deck and depending therefrom and defining a channel for receiving the lower edges of and supporting the hatch cover sections when swung to an upright position.

11. A lower deck hatch construction having the combination of a plurality of hatch cover sections and a substantially U-shaped coaming framing a hatchway in the deck and depending therefrom and defining a channel for receiving the lower edges of and supporting the hatch cover sections when swung to an upright position, said coaming and hatch cover sections having beveled cooperative seating surfaces when the cover sections are in covered relation to the hatch.

12. A lower deck hatch construction having the combination of a plurality of hatch cover sections and a substantially U-shaped coaming framing a hatchway in the deck and depending therefrom and defining a channel for receiving the lower edges of and supporting the hatch cover sections when swung to an upright position, said coaming and hatch cover sections having bevelel cooperative seating surfaces when the cover sections are in covered relation to the hatch and beams mounted transversely in the hatchway having guided support by the coaming to permit of longitudinal shifting of the same from an active position underlying and supporting the cover sections to an inactive position at the ends of the hatchway.

13. In a hatch construction for lower decks, a hatchway formed in the deck and including a depending marginal coaming of upwardly opening channel shaped cross section, end cover sections for covering the entire width of each end of the hatchway, a pair of central cover sections each covering half of the width of the hatchway portion between the end sections, and a pair of beams mounted transversely in the hatchway intermediate the ends thereof to normally support the side edges of the central cover sections and the end edges of the end cover sections and shiftable longitudinally of the hatchway to an inactive position adjacent the opposite ends thereof.

14. In a hatch construction for lower decks, a hatchway formed in the deck and including a depending marginal coaming of upwardly opening channel shaped cross section presenting an outer wall having an outwardly flared upper end formed with a horizontal inwardly directed lip, a hatch cover composed of central and end sections each having inclined outer ends adapted to underlie said lip and seat upon the flared upper end of the outer wall of the coaming when the sections are in closed relation to the hatchway and adapted to be swung upwardly and outwardly and sunk into the coaming channel to uncover the hatchway.

15. In a hatch construction for lower decks, a hatchway formed in the deck and including a depending marginal coaming of upwardly opening channel shaped cross section presenting an outer wall having an outwardly flared upper end formed with a horizontal inwardly directed lip, a hatch cover composed of central and end sections each having inclined outer ends adapted to underlie said lip and seat upon the flared upper end of the outer wall of the coaming when the sections are in closed relation to the hatchway and adapted to be swung upwardly and outwardly and sunk into the coaming channel to uncover the hatchway and a pair of beams mounted transversely in the hatch and supported for guided movement by the coaming to normally support the side edges of the central and the end edges of the end cover sections and capable of shifting longitudinally of the hatchway to an inactive position adjacent the opposite ends thereof.

16. A lower deck hatch construction including a channeled coaming opening upwardly and depending from and framing the hatchway and cover sections movable from a normal horizontal covering relation to a vertical position with the lower ends sunk into the channeled coaming.

17. A lower deck hatch construction embodying a channeled coaming open at the top, said coaming depending from and framing the hatchway, a pair of intermediate hatch cover sections at the sides of the hatchway, a pair of end hatch cover sections at the ends of the hatchway, a pair of beams mounted transversely of the hatchway for longitudinal shifting movement from an inactive out-of-the-way position at the ends of the hatchway to an active supporting position underlying the side edges of the intermediate hatch cover sections and the free ends of the end cover sections.

18. In a hatch construction for a lower deck, a hatchway formed in the deck including a depending coaming of upwardly opening channel shape presenting inner and outer walls joined by a bottom wall, the outer wall having an outwardly flared upper end and a horizontal inwardly directed lip, a cover for said hatchway including end sections for covering the entire width of each end of the hatchway and a pair of central sections each to cover half the width of the hatchway area lying between the end sections and each cover section having an outer edge shaped to seat upon the outwardly flared upper end of the outer wall of the coaming and to fit under the lip when the sections are in covering relation to the hatchway.

19. In a hatch construction for a lower deck, a hatchway formed in the deck including a depending coaming of upwardly opening channel shape presenting inner and outer walls joined by a bottom wall, the inner wall terminating below the deck surface and having an inwardly directed bead, the outer wall having an outwardly flared upper end and a horizontal inwardly directed lip, a cover for said hatchway including end sections for covering the entire width of each end of the hatchway and a pair of central sections each to cover half the width of the hatchway area lying between the end sections and each cover section having an outer edge shaped to seat upon the outwardly flared upper end of the outer wall of the coaming and to fit under the lip when the sections are in covering relation to the hatchway, said end cover sections being supported at the side edges by said bead and a pair of beams mounted transversely of the hatchway for shifting movement longitudinally thereof from an inactive out-of-the-way position at the ends of the hatchway to an active supporting position underlying the side edges of the intermediate hatch cover sections and the free ends of the end cover sections.

20. In a hatch construction for a lower deck, a hatchway formed in the deck including a depending coaming of upwardly opening channel shape presenting inner and outer walls joined by a bottom wall, the inner wall terminating below the deck surface and having an inwardly directed bead, the outer wall having an outwardly flared upper end and a horizontal inwardly directed lip, a cover for said hatchway including end sections for covering the entire width of each end of the hatchway and a pair of central sections each to cover half the width of the hatchway area lying between the end sections and each cover section having an outer edge shaped to seat upon the outwardly flared upper end of the outer wall of the coaming and to fit under the lip when the sections are in covering relation to the hatchway, said end cover sections being supported at the side edges by said bead and a pair of beams mounted transversely of the hatchway for shifting movement longitudinally thereof from an inactive out-of-the-way position at the ends of the hatchway to an active supporting position underlying the side edges of the intermediate hatch cover sections and the free ends of the end cover sections and supporting means carried by the inner walls of the coaming between which and the bead, the beams are guided.

HUBERT H. FLIEGEL.